(12) United States Patent
Gross et al.

(10) Patent No.: US 8,139,467 B2
(45) Date of Patent: Mar. 20, 2012

(54) REDUCED ENERGY CONSUMPTION USING ACTIVE VIBRATION CONTROL

(75) Inventors: Kenny C. Gross, San Diego, CA (US); Kalyanaraman Vaidyanathan, San Diego, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 324 days.

(21) Appl. No.: 12/469,023

(22) Filed: May 20, 2009

(65) Prior Publication Data

US 2010/0296383 A1 Nov. 25, 2010

(51) Int. Cl.
*G11B 17/00* (2006.01)
(52) U.S. Cl. ....... 369/247.1; 360/69; 360/137; 381/71.4
(58) Field of Classification Search ............... 369/247.1, 369/53.18; 360/69, 137, 77.02, 77.01; 340/425.5; 381/71.4, 71.11, 71.2, 94.1; 702/182
See application file for complete search history.

(56) References Cited

U.S. PATENT DOCUMENTS

| | | | | |
|---|---|---|---|---|
| 6,665,633 | B2* | 12/2003 | Fioravanti et al. | 702/182 |
| 6,937,423 | B1* | 8/2005 | Ngo et al. | 360/77.02 |
| 7,372,654 | B2* | 5/2008 | Fujie et al. | 360/69 |
| 7,486,470 | B1* | 2/2009 | Semba | 360/77.01 |
| 2003/0214891 | A1* | 11/2003 | Koh | 369/53.18 |
| 2007/0205875 | A1* | 9/2007 | De Haan | 340/425.5 |
| 2008/0159549 | A1* | 7/2008 | Copley et al. | 381/58 |

OTHER PUBLICATIONS

Cooley, John J., et al., Patent Application, "Determining Operating Fan Speed for Systems Containing Disk Drives to Minimize Vibrational Impact", Sun Microsystems, Inc., UN061081-US-NP.

* cited by examiner

*Primary Examiner* — Ali Neyzari
(74) *Attorney, Agent, or Firm* — Park, Vaughan, Fleming & Dowler LLP; Steve Stupp

(57) ABSTRACT

Embodiments of a computer system that includes a vibration-cancelling mode, and a related method and computer-program product (e.g., software) for use with the computer system, are described. During operation, a processor monitors operations in the computer system, and may select either the vibration-cancelling mode or an inactive mode based on the monitored operations. For example, the processor may select the vibration-cancelling mode when there are input/output-(I/O) intensive workloads to an array of one or more hard disk drives (HDDs) in the computer system. In this way, the processor may reduce the energy consumption associated with vibration-induced retries to the HDDs (and reduced I/O throughput) without increasing the energy consumption associated with active vibration damping at other times, such as when the computer system is idle or during processor-intensive workloads.

20 Claims, 5 Drawing Sheets

REDUCED ENERGY CONSUMPTION USING ACTIVE VIBRATION CONTROL

BACKGROUND

1. Field

The present disclosure relates to devices and techniques for reducing the energy consumption of a computer system. More specifically, the present disclosure relates to techniques for reducing the energy consumption in the computer system by monitoring and damping vibrations during a vibration-canceling mode.

2. Related Art

Driven by increasing processor clock speeds, semiconductor integration and computationally intensive applications, thermal loads in computer systems continue to increase. To transport the resulting heat away from critical components, such as processors, many high-end computer systems use increasingly powerful fans. Furthermore, in large-scale computer systems (such as data centers), air-conditioning units are now being mounted as close as possible to servers. For example, large air-conditioning units are now attached to the sides and tops of server racks. The use of larger cooling components in closer proximity to computer systems often exceeds the capabilities of the passive vibration-damping and mechanical-isolation techniques used in existing computer systems.

Concurrently, the scaling of the areal density in hard disk drives (HDDs) is making these devices increasingly sensitive to vibrations. For example, when reading or writing data, a transducer or head in a current HDD may need to follow a track on a spinning disk that is less than 20-nm wide, while maintaining a 7-nm vertical spacing with the disk surface. Even in the absence of external vibrations, it is already difficult to dynamically maintain these small mechanical tolerances. As a consequence, when subjected to external vibrations, track-following by the servo systems in HDDs can be degraded. When this occurs, the input/output (I/O) throughput of the HDDs (and, thus, the performance of the computer system) may be reduced by the resulting read or write retries.

Hence, there is a need for techniques to reduce vibrations in computer systems.

SUMMARY

One embodiment of the present disclosure provides a computer system that includes an array of one or more hard disk drives (HDDs). A vibration generator in the computer system damps vibrations in the computer system during a vibration-canceling mode and leaves the vibrations undamped during an inactive mode. Moreover, a processor monitors operations in the computer system and selects either the vibration-canceling mode or the inactive mode for the vibration generator based on the monitored operations.

Note that damping the vibrations during the vibration-canceling mode can reduce energy consumption of the computer system. For example, damping vibrations may decrease the number of retries in one or more of the HDDs and/or may increase the efficiency of cooling fans. In addition, note that the vibration generator may include a piezoelectric actuator and/or a mass-offset motor.

Furthermore, the monitored operations may include activity of the computer system, and the processor may select the inactive mode when the computer system is idle. (For example, the computer system is idle when there exists minimal processor and I/O activity, for example if the processor and I/O system are both less than 1% busy. Note that computer systems typically produce a small amount of background processor and I/O activity, even when no processes are executing.) Alternatively or additionally, the monitored operations may include activity of the processor, and the processor may select the inactive mode when the majority of the operations are associated with the processor and not the one or more HDDs (i.e., when the one or more HDDs in the array are unused or are not extensively used).

Similarly, the monitored operations may include an input/output (I/O) throughput of the array, and the processor may select the vibration-canceling mode when the I/O throughput of the array exceeds a predefined value. For example, the predefined value may include: an average I/O throughput of the array; an average I/O throughput of one or more active HDDs in the array; and/or at least 5% of a maximum I/O throughput of at least one of the one or more HDDs. Alternatively, the processor may select the vibration-canceling mode when vibrations (for example, as measured by an accelerometer) exceed a threshold. In another embodiment, the vibration-canceling mode is selected when both the measured vibrations and the measured I/O activity both exceed respective thresholds.

In some embodiments, the computer system includes a vibration sensor that measures a vibration metric in the computer system, thereby facilitating active control of the vibration generator during the vibration-canceling operating mode. This vibration metric may include a root-mean-square vibration level in the computer system. Alternatively or additionally, the vibration metric may correspond to an I/O throughput of the array, such as an I/O throughput associated with a predefined workload. Furthermore, the vibration sensor may be included in a set of distributed vibration sensors in the computer system that measure the vibration metric.

Note that the processor may adjust damping of the vibrations by the vibration generator during the vibration-canceling mode based at least on the vibration metric. Moreover, the vibration generator may damp the vibrations in the computer system during the vibration-canceling mode based at least on the vibration metric. For example, the vibration sensor, the processor and/or the vibration generator may constitute an active feedback loop for vibration control in the computer system.

In some embodiments, the vibration generator is one of a set of vibration generators located in the computer system. Each of these vibration generators may be associated with a corresponding subset of HDDs in a corresponding portion of the array. Furthermore, the processor may select the operating modes for the vibration generators in the set of vibration generators based at least on the monitored operations. For example, at a given time, a given vibration generator in the set of vibration generators can be in the vibration-canceling mode or in the inactive mode.

Another embodiment provides a method for damping vibrations in the computer system, which may be performed by one or more components in the computer system. During operation, the processor monitors operations in the computer system. Next, the processor may select either the vibration-canceling mode or the inactive mode for the vibration generator in the computer system based at least on the monitored operations. Note that, during the vibration-canceling mode, the vibration generator damps the vibrations in proximity to the array of HDDs in the computer system.

Another embodiment provides a computer-program product for use in conjunction with the computer system that includes instructions for some of the operations in the method.

BRIEF DESCRIPTION OF THE FIGURES

Note that like reference numerals refer to corresponding parts throughout the drawings.

DETAILED DESCRIPTION

Figure 1A:
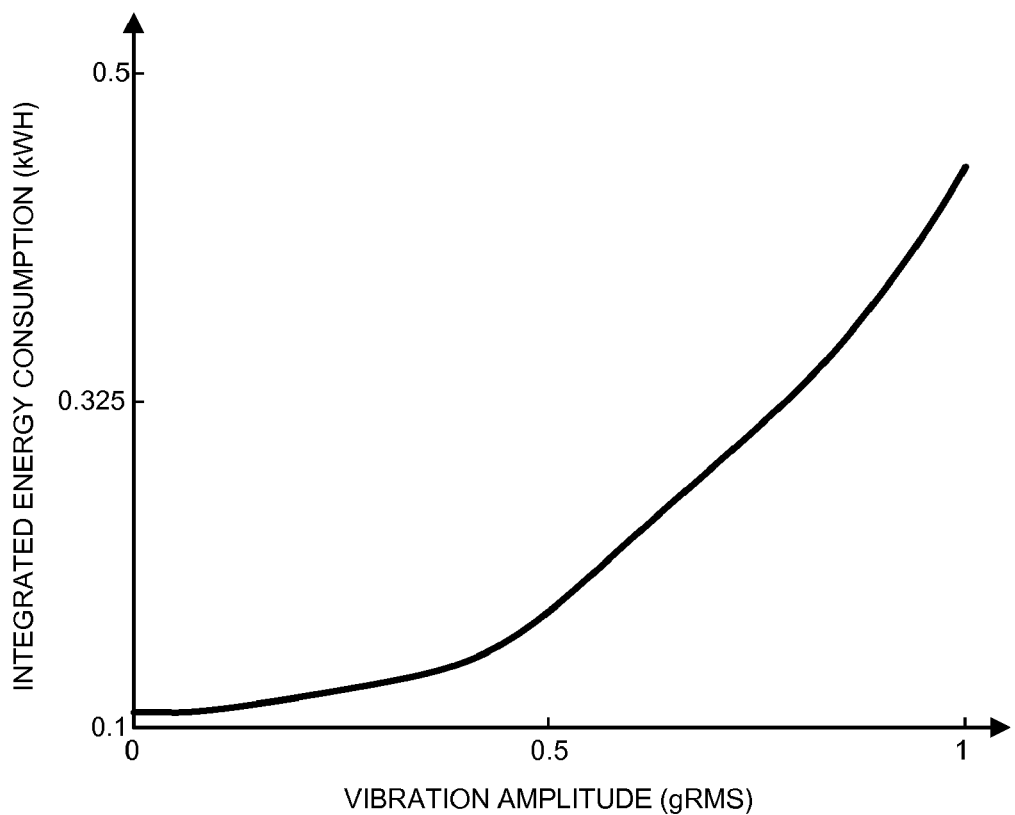
FIG. 1A is a graph of integrated energy consumption as a function of vibration amplitude in a computer system in accordance with an embodiment of the present disclosure.

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a computer system that includes a vibration-cancelling mode, and a related method and computer-program product (e.g., software) for use with the computer system, are described. During operation, a processor monitors operations in the computer system, and may select either the vibration-cancelling mode or an inactive mode based on the monitored operations. For example, the processor may select the vibration-cancelling mode when there are input/output-(I/O) intensive workloads to an array of one or more hard disk drives (HDDs) in the computer system. In this way, the processor may reduce the energy consumption associated with vibration-induced retries to the HDDs (and reduced I/O throughput) without increasing the energy consumption associated with active vibration damping at other times, such as when the computer system is idle or during processor-intensive workloads.

A "processor-intensive workload" is a workload during which the processor is busy executing instructions, but the I/O system is idle or nearly idle. For example, in some applications, such as an application that factors a prime number, the processor performs a large number of numerical computations on a small set of data without performing a significant number of I/O operations.

The differing workloads can be associated with different types of applications. For example, an application that solves a system of linear equations performs a large number of computational operations on a relatively small data set. Hence, this type of application generates a processor-intensive workload because it performs a large number of computational operations without performing a significant number of I/O operations. Another exemplary application is a relational database system, which performs a large number of I/O operations while processing relational queries that access relational database tables stored on disk. This type of application is I/O-intensive.

In the discussion that follows the vibration-reduction technique is applied to a computer system. However, in other embodiments, this technique may be applied to arrays of HDDs that are external to computer systems, such as storage arrays. Furthermore, the vibration-reduction technique may also be applied to an arbitrary mechanical device that includes rotating elements (such as fans and/or blowers), which operate more efficiently when vibration-induced eccentricity (and the associated gyroscopic inertial torque and friction) are reduced or eliminated.

We now describe embodiments of a computer system with reduced energy consumption. Recently, engineers at Sun Microsystems (of Santa Clara, Calif.) discovered that the energy consumption of servers is significantly affected by their vibrational health. As shown in FIG. 1A, which presents a graph 100 of integrated energy consumption (in units of kilo-Watt-hours or kWH) as a function of the vibration amplitude (in units of root-mean-square or RMS acceleration, normalized to 9.832 m/s$^2$, the acceleration g due to gravity at the earth's surface) in the computer system, the integrated energy consumption of the computer system increases significantly as the vibration amplitude increases.

Figure 1B:
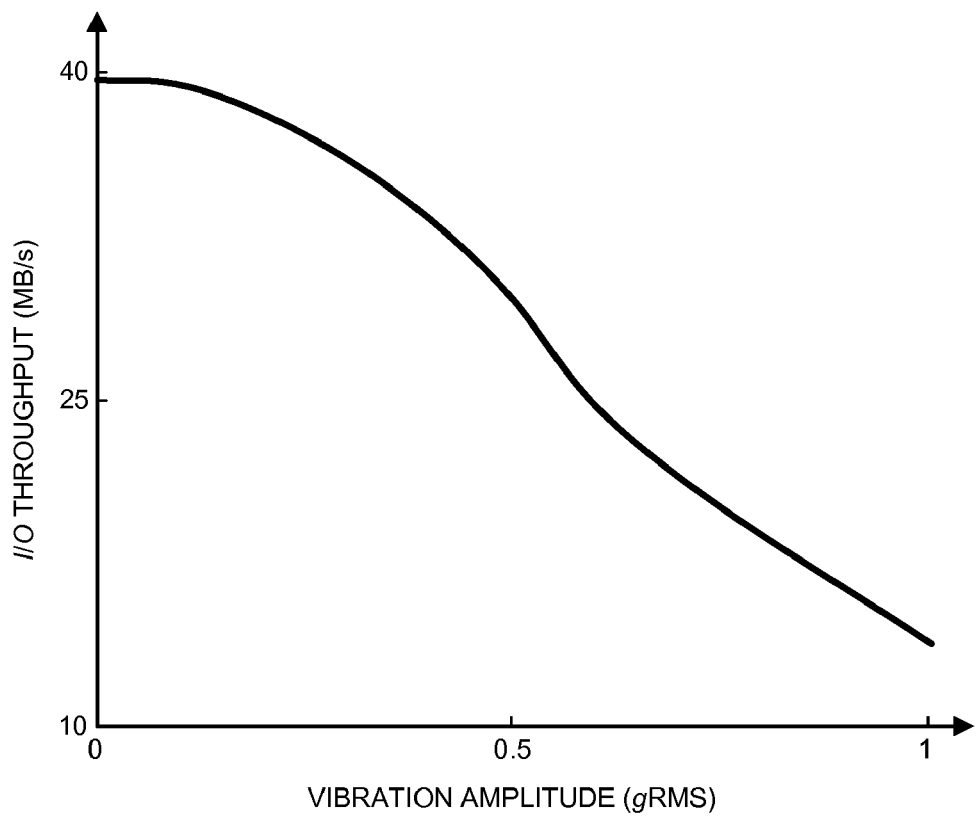
FIG. 1B is a graph of input/output (I/O) throughput as a function of vibration amplitude in the computer system of FIG. 1A in accordance with an embodiment of the present disclosure.

The dominant effect responsible for this increase in energy consumption is the increase in read and write retries by HDDs when there are sustained vibrations. This increase in read and write retries significantly decreases the I/O throughput. This is shown in FIG. 1B, which presents a graph 150 of I/O throughput (in units of megabytes per second or MB/s) as a function of the vibration amplitude in the computer system during I/O-intensive workloads. For example, the I/O throughput may decrease from 2.05 MB/s at zero vibration amplitude to 0.55 MB/s at 1 gRMS. Consequently, if a customer is performing an I/O-intensive workload (e.g., updating a large database, video streaming, web serving, etc.) and the HDD I/O throughputs are 20% lower, the I/O-intensive workload will take 20% longer to complete and the integrated energy consumption will be at least 20% larger. (In fact, the integrated energy consumption will be larger because of the reduced efficiency of the fans and HDDs in the computer system. In particular, when the computer system is vibrating, the increased eccentricity of the rotating shafts in these components results in increased radial friction and loading on the bearings, as well as inertial inefficiencies from gyroscopic effects. However, this effect is secondary to the reduction in I/O throughput.)

Existing computer systems use passive-damping and mechanical-isolation techniques to reduce the impact of vibration on components such as HDDs. However, as shown in FIGS. 1A and 1B, these approaches may no longer be sufficient to ensure lower energy consumption and high performance in many computer systems. To address this problem, computer system 200 in FIG. 2 performs active vibration damping during a vibration-canceling mode.

However, active vibration damping has an associated processor-cycle and energy-consumption cost. These costs are incurred by control logic, such as by one or more dedicated or general-purpose processor cores or processors 210 in computer system 200 (such as processor 210-1), which perform high-speed feedback-control calculations in a vibration-cancellation feedback loop. Because the increase in energy consumption associated with vibration may be smaller than the additional energy consumption associated with the vibration-canceling mode when computer system 200 is idle (up to 85% of the time for enterprise servers), or when computer system 200 is performing processor-intensive workloads, processor 210-1 may selectively enter and exit the vibration-canceling mode. In particular, processor 210-1 may monitor operations in the computer system (such as activity of computer system 200, processor 210-1 and/or one or more HDDs 212 in an array 214 in computer system 200), and may accordingly select either the vibration-canceling mode or an inactive mode. For example, processor 210-1 may select the inactive mode during processor-intensive workloads (e.g., when the one or more HDDs 212 in array 214 are unused or are not extensively used) or when computer system 200 is idle, and may select the vibration-canceling mode during I/O-intensive workloads (which may reduce vibration-induced energy consumption by increasing the I/O throughput and/or by increasing the efficiency of fans and blowers). In this way, processor 210-1 may reduce or minimize energy consumption by computer system 200 during I/O-intensive workloads (as well as increase the performance by increasing the I/O throughput), without adding unnecessary energy consumption during processor-intensive workloads or when computer system 200 is idle.

Computer system 200 may include one or more vibration generators 216 that are, at least, mechanically coupled to one or more of HDDs 212 in array 214. During the vibration-canceling mode, one or more of vibration generators 216 damp vibrations in or proximate to one or more of HDDs 212 and leave the vibrations undamped during the inactive mode. In particular, vibrations may be canceled out during the vibration-canceling mode by operating one or more vibration generators 216 out-of-phase. Note that one or more of vibration generator(s) 216 may include a piezoelectric actuator and/or a mass-offset motor. Some embodiments of the present invention cancel vibrations which match (or are in the vicinity of) resonant frequencies in the computer system, while vibrations at other non-resonant frequencies are not canceled because the non-resonant frequencies will have less of an effect of computer system performance. In some embodiments, the system cancels vibrations in the range of 50 Hz-500 Hz because such vibrations approximate disk drive rotational speeds, and are hence likely to affect disk drive performance, whereas other higher- or lower-frequency vibrations are less likely to affect disk drive performance.

In some embodiments, processor 210-1 monitors I/O throughput telemetry in real-time (e.g., continuously, periodically or asynchronously), and selects the vibration-canceling mode when the I/O throughput of one or more HDDs 212 or all of HDDs 212 in array 214 exceeds a predefined value (such as 5-10 MB/s). For example, the predefined value may include: an average I/O throughput (such as I/O operations per second) of array 214 (such as an average I/O throughput of 5% of the maximum I/O throughput of array 214); an average I/O throughput of one or more active HDDs 212 in array 214; and/or an average I/O throughput of at least 5% of a maximum I/O throughput of at least one of HDDs 212. Note that a variety of different definitions for the predefined value may work equally well because raid, striping and double striping ensure that, when there are I/O tasks, multiple HDDs 212 are typically active.

Because I/O throughput is degraded by vibrations (as shown in FIG. 1B), in some embodiments the I/O throughput of one or more of HDDs 212 is used as an indirect measure of the vibration amplitude or level during active vibration feedback control in the vibration-canceling mode. More generally, processor 210-1 and/or vibration generator(s) 216 may use a vibration metric to adjust damping of vibrations by vibration generator(s) 216 during the vibration-canceling mode. For example, the vibration metric may be the I/O throughput of array 214 while computer system executes a predefined workload, which has a known I/O throughput in the absence of vibration level or a known dependence of the I/O throughput as a function of the vibration level. Thus, the vibration metric may be: a binary value relative to the known I/O throughput for the predefined workload in the absence of vibration level; a set of discrete values based on the known dependence of the I/O throughput as a function of the vibration level for the predefined workload; and/or a continuous value based on the known dependence of the I/O throughput as a function of the vibration level for the predefined workload. In some embodiments, the vibration metric may be the I/O throughput for the predefined workload when blocks are read and/or written to fixed sector locations of one or more HDDs. In one embodiment, the vibration metric may be generated using the I/O throughput of the predefined workload when fixed size blocks from the outer-most sectors of one or more HDDs are read.

In some embodiments, computer system 200 includes one or more optional vibration sensors 218, which directly measure the vibration amplitude or level (or, more generally, the vibration metric) in or proximate to one or more of HDDs 212. These optional direct measurements of the vibration metric may be used by processor 210-1 and/or vibration generator(s) 216 to adjust damping of vibrations by vibration generator(s) 216 during the vibration-canceling mode. Note that in some embodiments, optional vibration sensor(s) 218 are distributed throughout array 214 and/or computer system 200.

Optional vibration sensor(s) 218 may include one or more linear accelerometers and/or one or more torsional accelerometers, either or which may measure the vibration metric, such as a root-mean-square vibration amplitude or level in computer system 200. Pairs of optional vibration sensors may be coplanar to allow the vibration metric to be measured in a plane, such as a symmetry plane of one or more of HDDs 212. In addition, in some embodiments, one or more of optional vibration sensor(s) 218 measures the vibration metric approximately out of the symmetry plane. In general, optional vibration sensor(s) 218 may measure vibration in different directions. In some embodiments, measurements from several of optional vibration sensor(s) 218 are averaged to obtain the vibration metric. Because it can be difficult to place vibration sensors in HDDs 212 due to space constraints, in some embodiments one or more mechanical phantom devices that include vibration sensors are substituted for one or more HDDs 212 in computer system 200. These mechanical phantom devices may not have the full functionality of HDDs 212.

In some embodiments, such as those with a large number of HDDs 212 in array 214, computer system 200 includes a set of vibration generators 216. Each of these vibration generators may be associated with a corresponding subset of HDDs 212 in a corresponding portion of array 214. Furthermore, processor 210-1 may select the operating modes for vibration generators 216 in the set of vibration generators based at least on the monitored operations. For example, at a given time, a given vibration generator (such as vibration generator 216-1) in the set of vibration generators can be in the vibration-canceling mode or the inactive mode. Processor 210-1 may select the vibration-canceling mode or in the inactive mode for each of the vibration generators 216 in the set of vibration generators using a multiple-input, multiple-output (MIMO) control technique.

Note that this vibration-reduction technique (and, thus, energy-management technique) in computer system 200 complements other existing power-management techniques (such as chip-clock gating, voltage scaling, core siestas, etc.). Consequently, the reduced energy consumption associated with this vibration-reduction technique is additive to those associated with the other existing power-management techniques.

Figure 2:
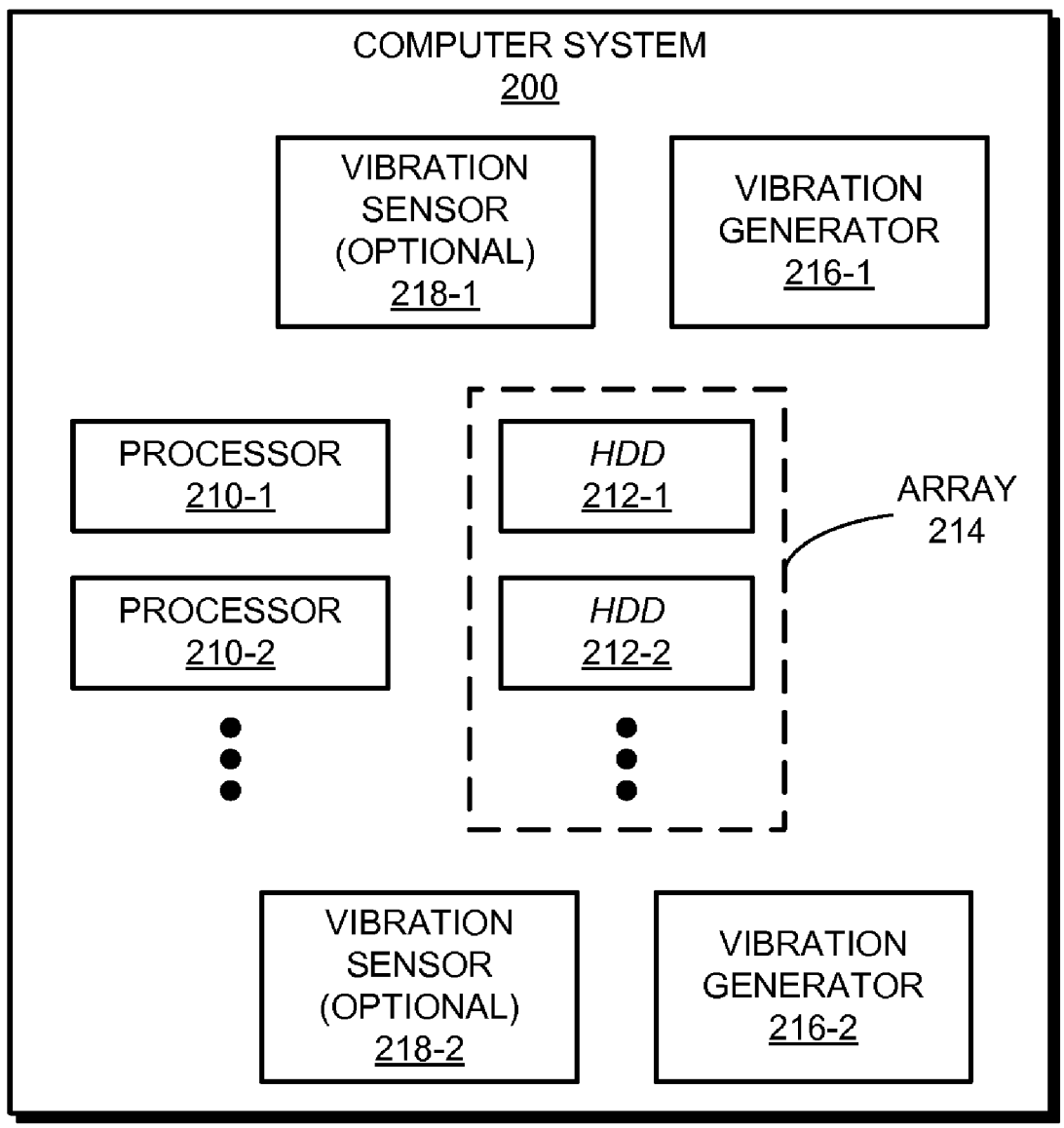
FIG. 2 is a block diagram illustrating a computer system in accordance with an embodiment of the present disclosure.
Figure 3:
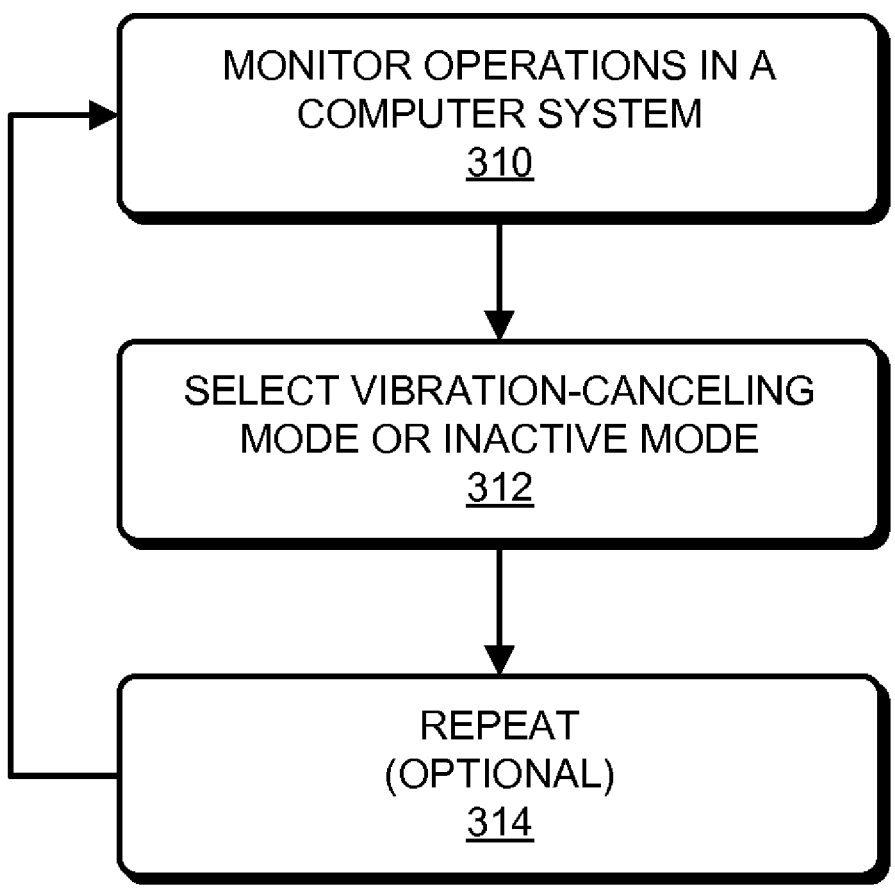
FIG. 3 is a flowchart illustrating a method for damping vibrations in the computer system of FIG. 2 in accordance with an embodiment of the present disclosure.

We now discuss embodiments of a method for damping vibrations in computer system 200 (FIG. 2). FIG. 3 presents a flowchart illustrating a method 300 for damping vibrations in computer system 200 (FIG. 2), which may be performed by one or more components in computer system 200 (FIG. 2).

During operation, a processor (such as processor 210-1 in FIG. 2) monitors operations in the computer system (operation 310). Then, the processor may select either the vibration-canceling mode or the inactive mode for a vibration generator in the computer system (such as vibration generator 216-1) based at least on the monitored operations (operation 312). Note that, during the vibration-canceling mode, vibration generator 216-1, as well as other vibration generators in vibration generators 216, damps the vibrations in proximity to and/or in an array of HDDs (such as array 214) in the computer system.

In some embodiments of process 300 there may be additional or fewer operations. For example, operations 310 and 312 may be optionally repeated multiple times or continuously (operation 314). Moreover, the order of the operations may be changed and/or two or more operations may be combined into a single operation. Additionally, the preceding operations may be implemented using hardware and/or software, as is known in the art.

In an exemplary embodiment, the I/O throughput of a server without external vibration is 64 MB/s. In the presence of external vibration, the I/O throughput decreases to 13-23 MB/s. Moreover, using active vibration damping to damp or reduce the vibration frequency closest to a resonance frequency of the HDDs in the server, in the presence of the same external vibration level the I/O throughput is 46-56 MB/s.

Figure 4:
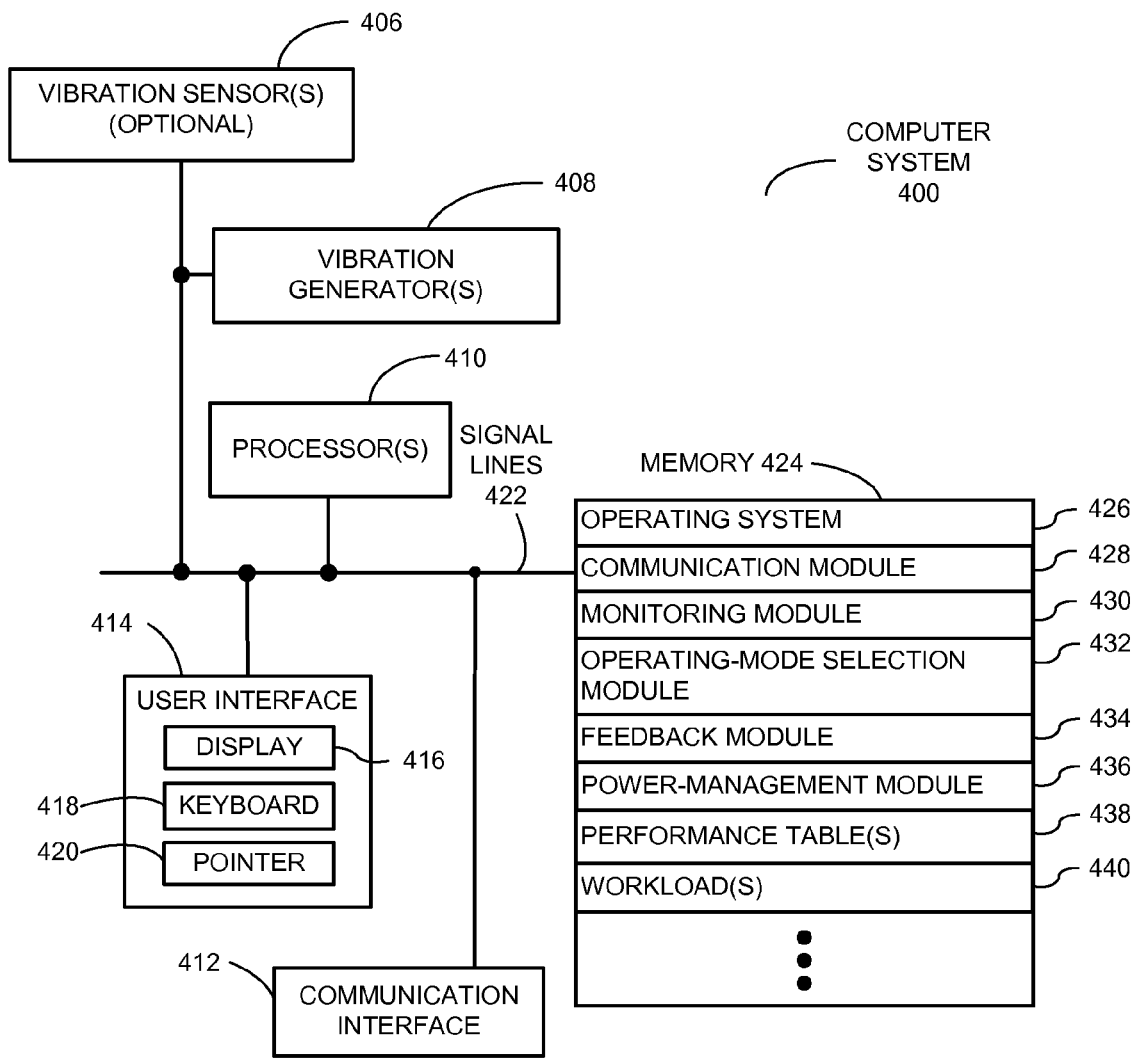
FIG. 4 is a block diagram illustrating a computer system in accordance with an embodiment of the present disclosure.

We now further describe embodiments of the computer system. FIG. 4 presents a block diagram illustrating computer system 400, which is another embodiment of computer system 200 (FIG. 2). Computer system 400 includes: one or more optional vibration sensors 406, one or more vibration generators 408, one or more processors (or processor cores) 410, a communication interface 412, a user interface 414, and one or more signal lines 422 coupling these components together. Note that the one or more processors (or processor cores) 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. Moreover, memory 424 may also store communication procedures (or a set of instructions) in a communication module 428. These communication procedures may be used for communicating with one or more computers, devices and/or servers, including computers, devices and/or servers that are remotely located with respect to the computer system 400.

Memory 424 may also include one or more program modules (or a set of instructions), including: monitoring module 430 (or a set of instructions), operating-mode selection module 432 (or a set of instructions), feedback module 434 (or a set of instructions), and/or power-management module 436 (or a set of instructions). Note that one or more of the program modules may constitute a computer-program mechanism.

During operation of computer system 400, monitoring module 430 may directly (such as via optional vibration sensor(s) 406) and/or indirectly monitor operation of computer system 400. For example, monitoring module 430 may monitor an average I/O throughput to one or more HDDs in memory 424. Based at least on direct and/or indirect vibration metric(s), operating-mode selection module 432 may select either the vibration-canceling mode or the inactive mode. During the vibration-canceling mode, vibration generator(s) 408 may damp vibrations in and/or proximate to one or more HDDs in memory 424. Furthermore, during the inactive mode, vibration generator(s) 408 may leave vibrations in computer system 400 undamped.

Note that during the vibration-canceling mode, feedback module 434 may directly or indirectly monitor vibration in computer system 400, and may accordingly adjust vibration generator(s) 408 to damp vibration. For example, based at least on the average I/O throughput to one or more HDDs in memory 424 and/or vibration measured by one or more of optional vibration sensor(s) 406, feedback module 434 (which is executed by one or more of processors 410) may adjust an amplitude(s) and/or a phase(s) of vibrations generated by vibration generator(s) 408.

Furthermore, feedback module 434 may reduce or minimize energy consumption by computer system 400 during the vibration-canceling mode, and operating-mode selection module 432 may reduce or minimize energy consumption by computer system 400 be selecting either the vibration-canceling mode or in the inactive mode. In some embodiments, these modules perform these operations using one or more performance table(s) 438, which each may include: vibration amplitudes, I/O throughput and/or energy consumption (as shown below in FIG. 5). For example, operating-mode selection module 432 may use one of performance tables 438 for a particular one of workloads 440 to relate measured I/O throughput to a vibration amplitude and/or an energy consumption, and thus, to select either the inactive mode or the vibration-canceling mode based on whether the measured I/O indicates that the vibration amplitude exceeds a threshold or the computer system is consuming energy unnecessarily because of the vibrations. Similarly, feedback module 434 may use one of performance tables 438 to adjust vibration generator(s) 408 during the vibration-canceling mode based at least on measured I/O throughput as an indirect measure of vibration amplitude for a particular one of workloads 440. Hence, performance tables 438 can include correlation coefficients which relate measured I/O throughput to vibration amplitude or to power consumption.

Additionally, in some embodiments, this vibration-reduction technique is used in conjunction with other power-management techniques, which are performed by power-management module 438.

Instructions in the various modules in the memory 424 may be implemented in: a high-level procedural language, an object-oriented programming language, and/or in an assembly or machine language. The programming language may be compiled or interpreted, i.e., configurable or configured, to be executed by the one or more processors (or processor cores) 410.

Although computer systems 200 (FIG. 2) and 400 are illustrated as having a number of discrete components, FIG. 4 is intended to be a functional description of the various features that may be present in computer systems 200 (FIG. 2) and 400 rather than a structural schematic of the embodiments described herein. In practice, and as recognized by those of ordinary skill in the art, the functions of computer systems 200 (FIG. 2) and 400 may be distributed over a large number of servers or computers, with various groups of the servers or computers performing particular subsets of the functions. These groups of the servers or computers may be at one location or may be distributed over multiple, geographically dispersed locations. Consequently, instructions and/or data associated with operations that are executed by computer system 400 may be received and communicated within computer system 400 over a network, such as: the Internet or World Wide Web (WWW), an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

In some embodiments, some or all of the functionality of computer systems 200 (FIG. 2) and 400 may be implemented in one or more application-specific integrated circuits (ASICs) and/or one or more digital signal processors (DSPs).

Computer systems 200 (FIG. 2) and 400 may include fewer components or additional components. Moreover, two or more components may be combined into a single component and/or a position of one or more components may be changed. In some embodiments the functionality of computer systems 200 (FIG. 2) and 400 may be implemented more in hardware and less in software, or less in hardware and more in software, as is known in the art.

Figure 5:
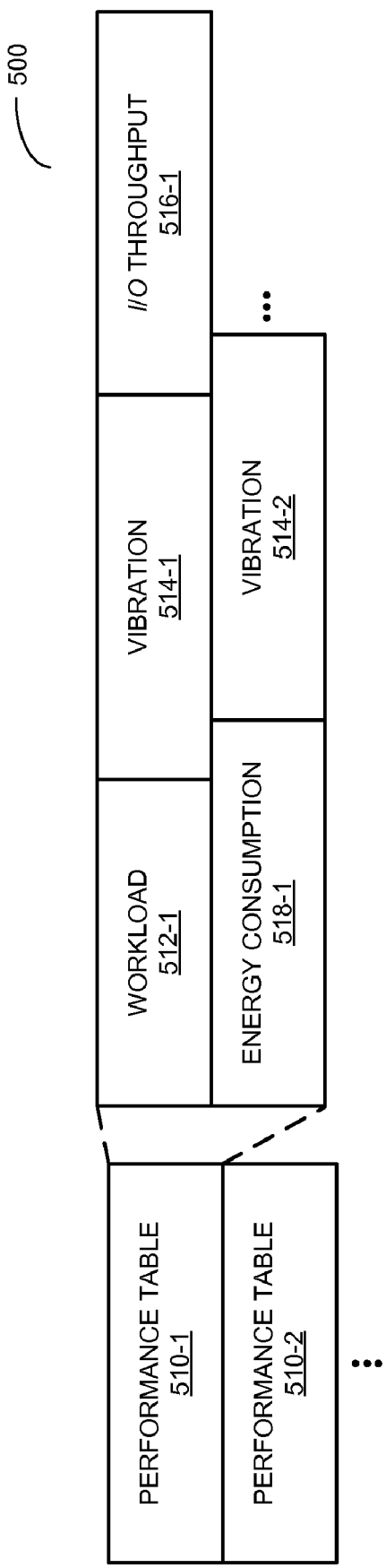
FIG. 5 is a block diagram illustrating an embodiment of a data structure for use in the computer systems in FIGS. 2 and 4 in accordance with an embodiment of the present disclosure.

We now describe data structures for use in computer system 200 (FIG. 2) and 400. FIG. 5 presents a block diagram illustrating an embodiment of a data structure 500 for use in computer systems 200 (FIG. 1) and 400 (FIG. 4). This data structure may include performance tables 510. More specifically, for a particular workload or type of workload (such as workload 512-1), a given instance of performance tables 510 (such as performance table 510-1) may include multiple groups of entries for: vibration amplitudes 514 and associated I/O throughputs 516 and/or energy consumption 518. These performance tables may be used to reduce or minimize energy consumption in computer systems 200 (FIG. 2) and 400 (FIG. 4).

Note that that in some embodiments of data structure 500 there may be fewer or additional components. Moreover, two or more components may be combined into a single component and/or a position of one or more components may be changed.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A computer system, comprising:
   an array of one or more hard disk drives (HDDs);
   a vibration generator configured to damp vibrations in the computer system during a vibration-canceling mode and to leave the vibrations undamped during an inactive mode; and
   a processor configured to monitor operations in the computer system and to select an operating mode for the vibration generator based at least on the monitored operations, wherein the operating mode of the vibration generator can be the vibration-canceling mode or the inactive mode, and wherein the monitored operations comprise an activity of the computer system.

2. The computer system of claim 1, wherein damping the vibrations during the vibration-canceling mode reduces energy consumption of the computer system.

3. The computer system of claim 1,
   wherein the processor is configured to select the inactive mode when the computer system is idle.

4. The computer system of claim 1, wherein the activity of the computer system comprises an activity of the processor; and
   wherein the processor is configured to select the inactive mode when the majority of the operations are associated with the processor.

5. The computer system of claim 1, wherein the activity of the computer system comprises an input/output (I/O) throughput of the array; and
   wherein the processor is configured to select the vibration-canceling mode when the I/O throughput of the array exceeds a predefined value.

6. The computer system of claim 5, wherein the predefined value includes an average I/O throughput of the array.

7. The computer system of claim 5, wherein the predefined value includes an average I/O throughput of one or more active HDDs in the array.

8. The computer system of claim 5, wherein the predefined value is at least 5% of a maximum I/O throughput of at least one of the one or more HDDs.

9. The computer system of claim 1, further comprising a vibration sensor configured to measure a vibration metric in the computer system, thereby facilitating active control of the vibration generator during the vibration-canceling operating mode.

10. The computer system of claim 9, wherein the vibration metric includes a root-mean-square vibration level in the computer system.

11. The computer system of claim 9, wherein the vibration sensor is included in a set of distributed vibration sensors in the computer system that is configured to measure the vibration metric.

12. The computer system of claim 9, wherein the vibration metric corresponds to an I/O throughput of the array.

13. The computer system of claim 12, wherein the I/O throughput of the array is associated with a predefined workload.

14. The computer system of claim 9, wherein the processor adjusts damping of the vibrations by the vibration generator during the vibration-canceling mode based at least on the vibration metric.

15. The computer system of claim 9, wherein the vibration generator damps the vibrations in the computer system during the vibration-canceling mode based at least on the vibration metric.

16. The computer system of claim 1, further comprising a set of vibration generators, which include the vibration generator, which are each associated with a corresponding subset of HDDs in a corresponding portion of the array, wherein the processor is configured to select the operating modes for the vibration generators in the set of vibration generators based at least on the monitored operations.

17. The computer system of claim 16, wherein, at a given time, a given vibration generator in the set of vibration generators can be in the vibration-canceling mode or in the inactive mode.

18. The computer system of claim 1, wherein the vibration generator includes a piezoelectric actuator or a mass-offset motor.

19. A computer-implemented method for damping vibrations in a computer system, comprising:
- monitoring operations in the computer system, wherein the monitored operations comprise an activity of the computer system; and
- selecting an operating mode for a vibration generator in the computer system based at least on the monitored operations, wherein the operating mode of the vibration generator can be a vibration-canceling mode or an inactive mode; and
- wherein the vibration generator damps the vibrations in proximity to an array of HDDs in the computer system during the vibration-canceling mode.

20. A computer-program product for use in conjunction with a computer system, the computer-program product comprising a computer-readable storage medium and a computer-program mechanism embedded therein for damping vibrations in the computer system, the computer-program mechanism including:
- instructions for monitoring operations in the computer system, wherein the monitored operations comprise an activity of the computer system; and
- instructions for selecting an operating mode for a vibration generator in the computer system based at least on the monitored operations, wherein the operating mode of the vibration generator can be a vibration-canceling mode or an inactive mode; and
- wherein the vibration generator damps the vibrations in proximity to an array of HDDs in the computer system during the vibration-canceling mode.

* * * * *